Jan. 31, 1950
C. O. HOLT
2,496,212
DIAMETER MEASURING DEVICE
Filed June 6, 1944
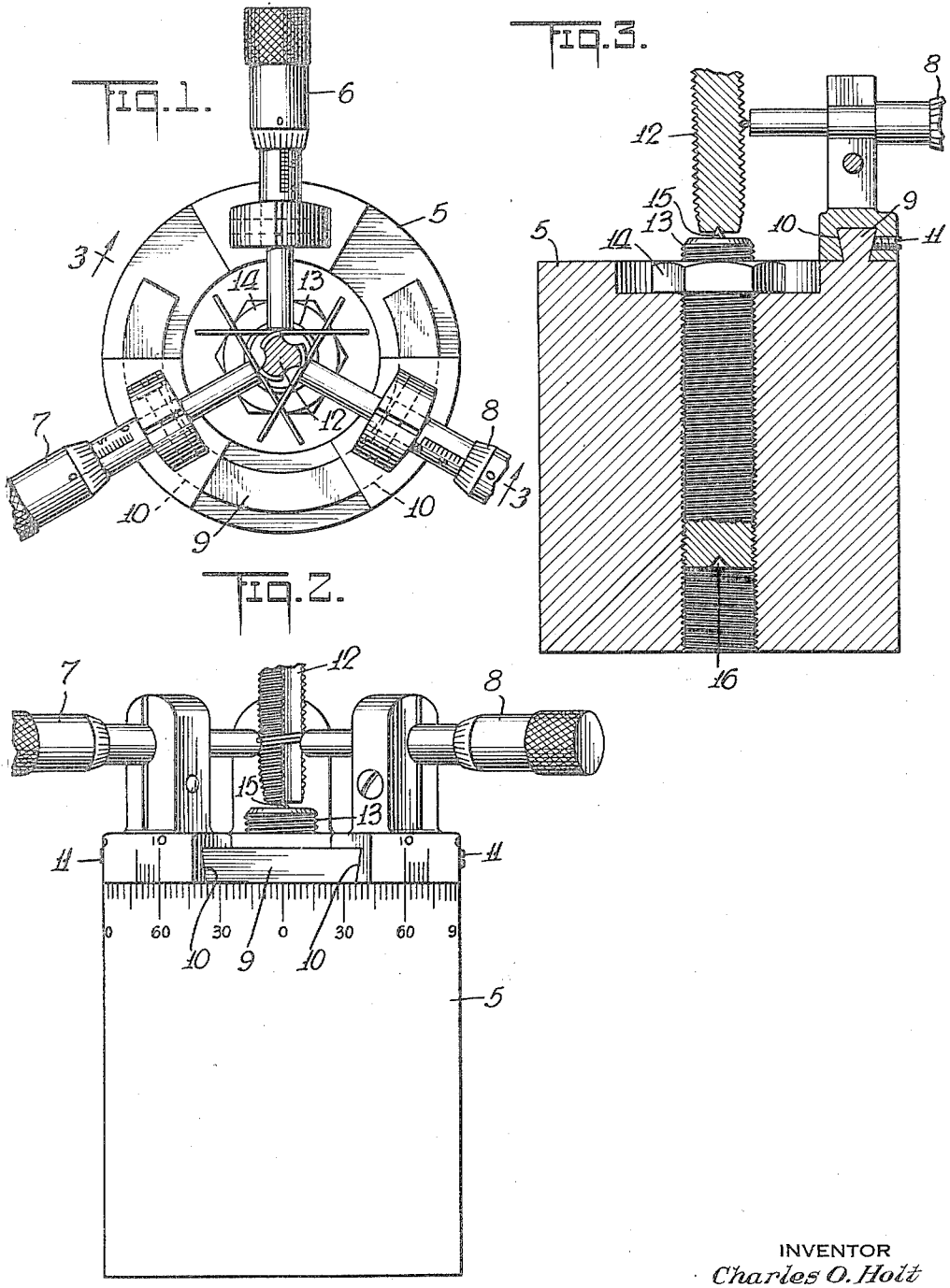
INVENTOR
Charles O. Holt
BY
ATTORNEYS.

Patented Jan. 31, 1950

2,496,212

UNITED STATES PATENT OFFICE 2,496,212

DIAMETER MEASURING DEVICE

Charles O. Holt, New Britain, Conn., assignor to The American Hardware Corporation, New Britain, Conn., a corporation of Connecticut Application June 6, 1944, Serial No. 538,921

1 Claim. (Cl. 33—178)

My invention relates to a measuring device for measuring diameters in general, and more particularly for measuring pitch diameters or outside diameters of fluted taps, counterbores and the like, especially those having an odd number of flutes.

The present commercial method of measuring the pitch diameter, say of a three-fluted tap, is to lay the tap in a V-block and interpose the ends of two measuring wires between each of the sides of the V-block and the threads on two of the flutes of the tap. A fifth wire is laid in the thread of the third flute, and a micrometer measurement is then taken over that fifth wire and a reference surface on the V-block. That method of measurement requires considerable calculation, and the principal disadvantages of that method and the V-block apparatus are, first, a great many different sized V-blocks are required for measuring taps of different diameters; second, the measuring wires can ordinarily be used only at the ends, since they engage the bottom of the V-blocks, and the wires are usually less accurate in diameter adjacent the ends than they are at points intermediate the ends; third, for odd fluted taps different sets of V-blocks must be provided to correspond with the numbers of flutes in the tap or other instrument being measured.

It is the principal object of my invention to provide simple means for measuring diameters, more particularly of odd-fluted taps and the like.

It is another object to provide improved apparatus which may be readily adjusted for measuring diameters on fluted taps and the like having any number of flutes.

Another object is to provide a measuring device of the character indicated for measuring taps and the like in a wide range of sizes.

Other objects and various features of novelty of the invention will be hereinafter pointed out or will become apparent to those skilled in the art.

Generally speaking my improved device includes three measuring instruments, such as micrometers, which instruments may preferably be adjusted so as to be operable on three flutes, more or less equally placed about the circumference of the tap or the like. The measuring instruments, such as micrometers, are preferably arranged so that when all are brought up to the piece being measured and are set to have equal readings, each micrometer reading will measure or be proportional to a radius of the work piece.

As suggested, my improved apparatus may be employed for measuring diameters in general but it is particularly advantageous for the measurement of fluted taps, counterbores, etc., having odd numbers of flutes.

In the drawings which show, for illustrative purposes only, a preferred form of the invention—

Fig. 1 is a top plan view of one form of apparatus embodying the invention;

Fig. 2 is a view in side elevation of the parts shown in Fig. 1; and

Fig. 3 is a fragmentary sectional view taken substantially in the plane of the line 3—3 of Fig. 1.

In the preferred form shown the measuring device includes a body or base 5 and a plurality of measuring instruments, such as micrometers 6—7—8, are secured to the base. For a measuring device of more or less universal application the micrometers are arranged for movement relatively to each other. In the form shown the micrometer 6 is in fixed circumferential position on the base and the micrometers 7—8 are mounted for circumferential adjustment on the base without, however, changing their radial positions thereon. In the form illustrated the base has a dovetail 9 thereon and the mountings for the micrometers 7—8 have dovetail slots, such as 10, to fit the dovetail 9. The dovetail 9 and the corresponding slots 10 are arcuate in shape, so that the micrometers may be adjusted circumferentially without varying their radial adjustment. The adjustable micrometers may be held in adjusted positions, as by means of set screws 11—all as will be understood. In the preferred arrangement the micrometers are mounted so that equal readings thereon indicate equal distances from the common center.

If desired the base may be graduated circumferentially in degrees, as indicated in Fig. 2, and the mountings for the adjustable micrometers may be provided with vernier graduations, as indicated.

In order to accurately center a work piece, such as a three-fluted tap 12, I provide a center plug 13, which may be threaded into or have a sliding fit in a bore of the base 5 and be held or locked in adjusted position by means of a lock or supporting nut 14. The center plug may have a projecting center 15 at one end and a socket center 16 at the other end to accommodate the coacting centering means on various taps, counterbores or other tools to be measured. It will be understood, of course, that the centering plug may be turned end for end in the base.

The method of employing my improved measuring device may best be described in connection with an assumed example. We may assume that we wish to measure the pitch diameter of a number 10 tap, 32 threads to the inch. Now the basic pitch diameter and, say, the lower permissible limit to which the tap may wear, is 0.1697 inch. In order to provide a usable tap the pitch diameter should be, say, 0.0005 larger than the low limit so as to have a reasonably long useful life before wearing down to the low limit of 0.1697. Therefore, the measured pitch diameter should be, say, 0.1697 plus 0.0005, or 0.1702. Since the micrometers cannot engage the tap at its pitch diameter standard measuring wires are employed. For a 32-pitch thread the standard measuring wire is of a diameter of 0.01804 inch. When it is recalled that in a standard V-thread the wire engaging at the pitch diameter will project three-quarters of its diameter beyond the pitch diameter, it will be seen that the measurement over two wires would be three-quarters of 0.03608 or 0.02706 inch. Therefore, the actual measurement of the tap pitch diameter plus two wires should be 0.1702 plus 0.2706 or 0.1972 inch. Since each micrometer actually measures a radius instead of a diameter, the actual reading on each micrometer should be one-half of 0.1972 or 0.0986 inch.

Our assumed tap 12 is placed on the centering plug and two of the heads with the wires interposed between the spindles and the high points of the tap are each turned up so as to read 0.0986. The third micrometer with the wire interposed between the third high point on the tap and the spindle is then turned up. If all three micrometers then read 0.0986 the tap is of our assumed proper diameter. If the reading of the third micrometer is not the same as that of the first two, then all of the micrometers should be readjusted until they read the same. For example, suppose the readjusted micrometers all read 0.0985. Then the actual pitch diameter of the tap plus the wires is double each micrometer reading, or 0.1970 inch. If we subtract the wire constant 0.02706 the actual pitch diameter will be found to be 0.1700 inch or 0.0002 small. However, since in our assumed tap we added 0.0005 to take care of wear, we will still have a margin of 0.0003 for actual wear of the tap in use and the tap would be of satisfactory diameter and could be used until that amount has been worn off. In measuring other fluted tools, such as counterbores, which are not threaded there is obviously no necessity for employing the measuring wires, and the procedure is consequently somewhat simplified.

It will be noted that the measuring wires, which are articles of commerce, may be placed in such a way that any point on their length may be employed to stand between the micrometer spindles and the pitch diameter of the tap. Such measuring wires are of more uniformly accurate diameter along their lengths intermediate their ends than they are at their ends. Therefore, my improved measuring device makes for much greater accuracy than the V-block measuring devices where only the ends of the wires may be employed, and this is more particularly true the smaller the tap to be measured.

When a three-fluted piece is to be measured the micrometers are arranged 120 degrees apart. When other fluted pieces having a different number of flutes are to be measured the micrometers are adjusted circumferentially so as to be more or less equally spaced and provide three point engagement and support for the piece being measured.

While the invention has been described in considerable detail and the preferred form illustrated, it is to be understood that various changes may be made within the scope of the invention as defined in the appended claim.

I claim:

In a measuring device of the character indicated, a base, a centering plug, screw threaded means for holding said plug in selected positions of longitudinal adjustment on said base, said plug having centering means for axially engaging a coacting part on an article the diameter of which is to be measured so as to center the article radially, three measuring instruments carried by said base and circumferentially adjustable relatively to each other about the axis of said plug, said three measuring instruments each having a measuring part movable in a direction radially of the axis of said centering plug, whereby during a measuring operation on an article all three measuring instruments may show duplicate readings when said measuring parts cooperate with the piece to be measured.

CHARLES O. HOLT.

REFERENCES CITED

The following references are of record in the file of this patent:

UNITED STATES PATENTS

| Number | Name | Date |
|---|---|---|
| 1,190,789 | Koelpin | Sept. 5, 1916 |
| 1,464,938 | Jordan | Aug. 14, 1923 |
| 2,341,679 | Wildermuth | Feb. 15, 1944 |
| 2,363,077 | Moore | Nov. 21, 1944 |
| 2,393,094 | Fenn | Jan. 15, 1946 |

FOREIGN PATENTS

| Number | Country | Date |
|---|---|---|
| 355,061 | Germany | June 20, 1922 |